United States Patent [19]

Hasquenoph et al.

[11] 4,088,287
[45] May 9, 1978

[54] DUAL-PURPOSE EJECTOR FOR AIRCRAFT LOAD JETTISONING MECHANISM

[75] Inventors: Jean H. Hasquenoph, Lagny-sur-Marne; Pierre F. Coutin, Paris, both of France

[73] Assignee: R. Alkan & Cie., Valenton, France

[21] Appl. No.: 765,469

[22] Filed: Feb. 4, 1977

[30] Foreign Application Priority Data

Mar. 9, 1976 France .............................. 76 06648
Aug. 9, 1976 France .............................. 76 24257

[51] Int. Cl.² .................................................. B64D 1/02
[52] U.S. Cl. ........................... 244/137 R; 89/1.5 C; 89/1.5 F
[58] Field of Search .............. 244/137 R; 89/1.5 R, 89/1.5 C, 1.5 F, 6; 294/83 AE

[56] References Cited

U.S. PATENT DOCUMENTS

| | | |
|---|---|---|
| 2,931,341 | 4/1960 | Meadows et al. ........... 244/137 R X |
| 3,557,550 | 1/1971 | LeGarra .......................... 244/137 R |
| 3,756,545 | 9/1973 | Coutin ............................. 244/137 R |

FOREIGN PATENT DOCUMENTS

1,323,073  7/1973  United Kingdom ............ 244/137 R

Primary Examiner—Barry L. Kelmachter
Attorney, Agent, or Firm—William Anthony Drucker

[57] ABSTRACT

In a telescopic retractable ejector, the driving gas is allowed to flow freely with the maximum efficiency by compensating the pressure drop resulting from the gas expansion during the piston extension with a concomitant and automatic increment in the surface area of the pistons which is exposed to the gas pressure.

8 Claims, 8 Drawing Figures

DUAL-PURPOSE EJECTOR FOR AIRCRAFT LOAD JETTISONING MECHANISM

BACKGROUND OF THE INVENTION

1. Field of the Invention

The present invention relates to means for ejecting or jettisoning loads from aircraft by utilizing the thrust produced by expanding gases, and has specific reference to an improved retractable telescopic device of this character.

In the devices disclosed in the U.S. Pat. Nos. 3,756,545 and 3,871,604, the surface area receiving the gas thrust is smaller at the end of the stroke than at the beginning thereof. Since, on the other hand, the gas pressure decreases as the telescopic device expands, a substantial discrepancy is observed between the initial thrust and the thrust produced at the end of the piston stroke on the load.

To the energy necessary for imparting a predetermined speed to the load there corresponds a substantial reaction exerted on the aircraft structure during the initial portion of the movement, this reaction decreasing as the stroke increases. In certain cases, this initial reaction is inconsistent with the strength of the aircraft structure, so that for imparting nevertheless the necessary velocity to the load a permissible thrust as constant as possible and in any case definitely lower that the peak thrust must be created while utilizing the same amount of energy.

Various arrangements have been developed with a view to obtain this result, for example by reducing the gas feed at the beginning of the movement and permitting a greater gas flow beyond a predetermined piston stroke. This method, consisting broadly in partially throttling the initial gas passage, is objectionable in that it is attended by a certain erosion of the throttled regions while promoting a dissipation of energy by increasing the heat exchange between the hot gases remaining for a longer time in contact with the wall surfaces located upstream of the device.

2. Description of the Invention

It is the essential object of the present invention to avoid the inconveniences mentioned hereinabove by allowing a free gas flow, with maximum efficiency, and compensating the pressure drop resulting from the gas expansion during the extension of the telescopic pistons through a concomitant and automatic increment in the cross-sectional surface area of the piston means on which the gas pressure is exerted.

In order to afford a clearer understanding of this invention, a first form of embodiment thereof, together with a modified construction, followed by a second form of embodiment will now be described, as illustrated in the attached drawings, in which:

DESCRIPTION OF THE PREFERRED EMBODIMENTS

Figure 1:
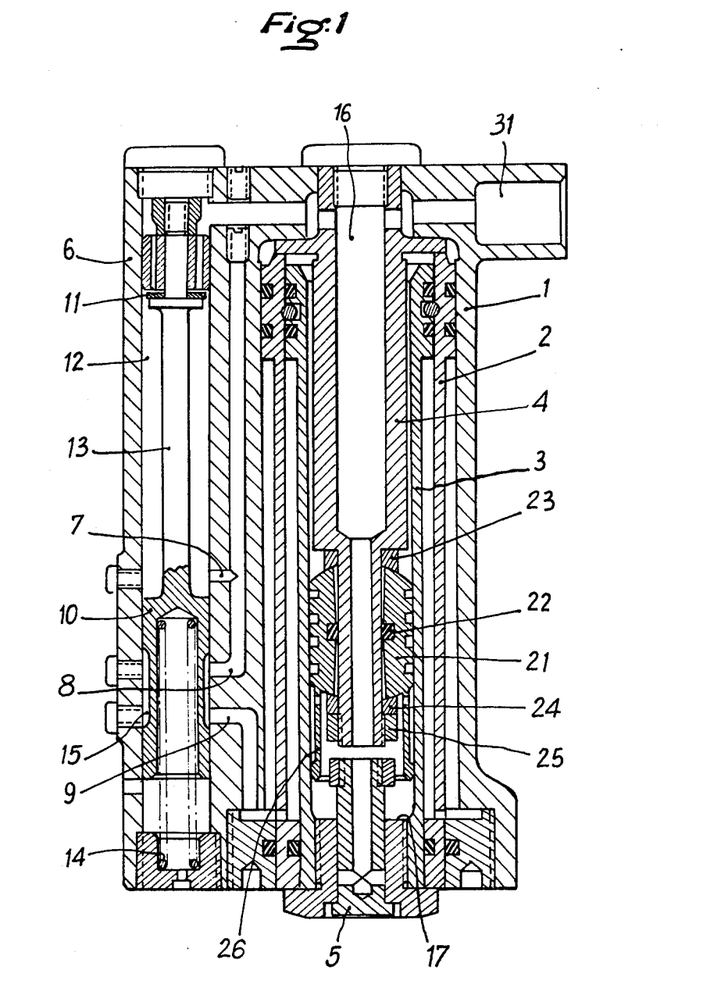
FIG. 1 is a longitudinal axial section showing the device of the first form of embodiment in its retracted position.

Referring first to FIG. 1, the reference numeral 1 designates the body of the device, 2 being an outer piston slidably mounted in a bore of said body 1, another, inner piston 3 being in turn slidably mounted in said outer piston 2. The inner piston 3 surrounds a hollow cylinder 4 secured to the upper end of the body 1, as shown. A hollow cylindrical spool valve 5 mounted in the lower end portion of piston 3 is adapted to vent to the free atmosphere any gas remaining upstream of the device, at the end of the ejection proper. An auxiliary cylinder 6 adjacent the body 1 communicates via ports 7, 8 and 9 with said body. In this cylinder 6, another piston and spool valve unit 10, 11 is slidably fitted for constituting a distributor of compressed gases under the heads of the main telescopic pistons 2 and 3 and thus retract these pistons upon completion of their positive strokes or functions. This distributor piston 10 incorporates a valve 11 allowing the passage of gas from the very beginning of their supply to the device and at their maximum pressure into the annular chamber 12 formed between the auxiliary cylinder 6 and the stem 13 of distributor piston 10. A compression spring 14 constantly urges this piston 10 to its uppermost position, as shown in FIG. 1. In this last-mentioned position, a circular groove 15 formed in the outer periphery of piston 10 causes the port 9 to communicate with the annular chamber 12 via ports 8 and 7.

Figure 2:
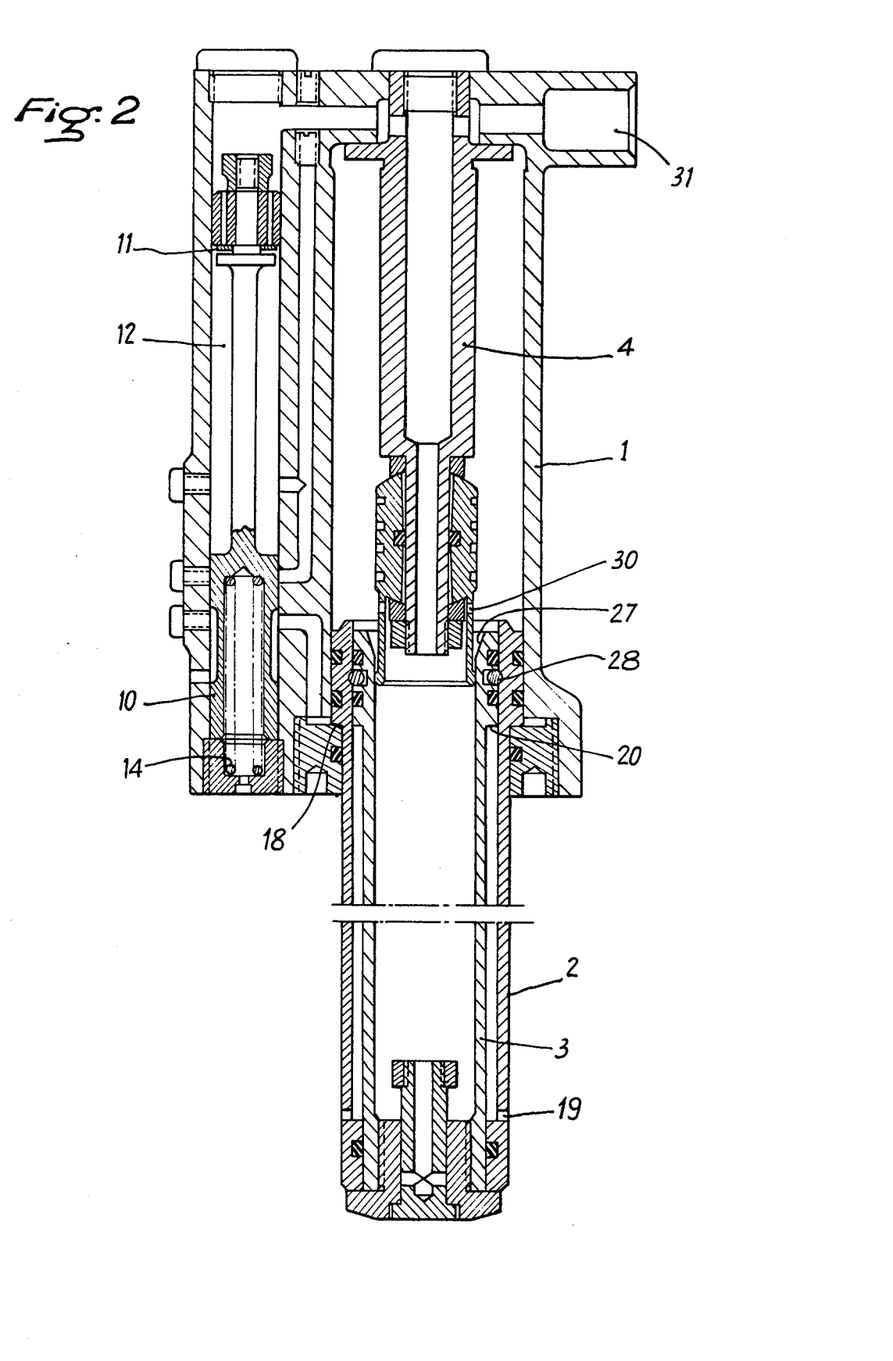
FIG. 2 is a similar section showing the same device with parts broken away, to illustrate the relative positions of the component elements after the first phase of the extension of the telescopic pistons.
Figure 3:
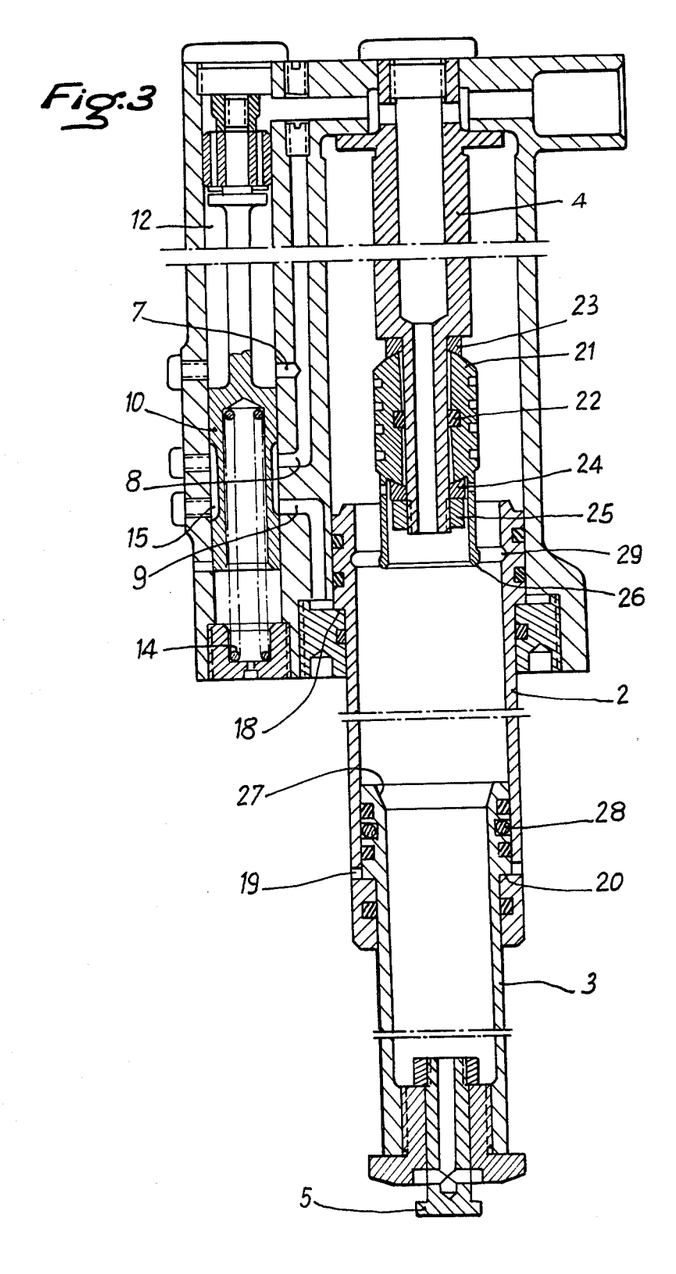
FIG. 3 is a longitudinal section (with various parts broken away) corresponding to the complete extension of the telescopic pistons and showing the relative position of the elements causing the subsequent retraction thereof.

The description of the device will now be completed by explaining the mode of operation thereof with reference to FIGS. 1 to 3.

The gases are supplied at their maximum pressure via a pipe line (not shown) to an inlet union 31 of body 1, and flow through a passage 16 of hollow cylinder 4 until they strike the reduced area 17 closing the bottom of piston 3. The thrust thus produced is relatively moderate owing to the relatively reduced surface area involved. At the same time the gases force the distributor piston 10 back against the resistance of its return spring 14 and penetrate into the annular chamber 12 through the valve 11 holding said gases in reserve as illustrated in FIG. 2, while the port 8, communicating with chamber 12 via port 7, is isolated from the circular groove 15 and therefore from port 9.

Due to the thrust exerted by the gases against the bottom of piston 3, the assembly comprising both pistons 3 and 2 is caused to slide in the body 1 and assumes the intermediate position illustrated in FIG. 2.

A resilient member is provided for driving the piston 2 by means of piston 3 during the first phase of the extension to avoid a sudden taking up of the difference between the first and second pistons when the gases are introduced above these two pistons during the second phase, in case piston 2 did not follow piston 3. This drive is obtained in this example in the form of a resilient seal or O-ring 28 fitted in a circular groove 29 common to both pistons so that the elasticity of said ring, under the pressure exerted by piston 3, will enable the latter to continue its stroke when piston 2 abuts at the end of its stroke and of the first phase of the extension of the telescopic piston assembly.

In this position, the partially expanded gases exert their pressure on the entire cross-sectional surface area of piston 3, which may be twice the surface consisting of the bottom of that piston 3. This action takes place when the orifices 30 at the bottom of cylinder 4 are uncovered by piston 3 and a fortiori when piston 3 emerges completely from hollow cylinder 4.

It is clear that the pressure drop compensated by the increment in the surface area against which the gas pressure is exerted will provide a thrust substantially equal to the initial thrust while avoiding the inconvenience of an excessive initial thrust and preserving the same efficiency of the ejection device.

When the load has been ejected and separated from the device, the bottom spool valve 5 assumes the position shown in FIG. 3, thus venting to the free atmosphere the residual gases retained upstream, and the auxiliary or distributor piston 10, urged by spring 14, resumes its initial position shown in FIG. 1. The high-pressure gas reserve stored in annular chamber 12 communicates via orifices 7, 8 and 9 and also via annular groove 15, with the lower surface 18 of the head of piston 2 which resumes its uppermost position (FIG. 1) while carrying along the inner piston 3. Through the orifice 19 formed in piston 2 adjacent the lower end thereof, the reserve gas will then exert a pressure also against the lower surface 20 of the head of piston 3, whereby the latter will also resume its uppermost position shown in FIG. 1.

Since piston 3 must slide both in piston 2 and on the hollow cylinder 4 without any undue play, a slightly floating sealing member 21 is provided, this sealing member 21 oscillating about a resilient intermediate seal 22 between part-spherical seats 23, 24 retained by a nut 25. A skirt 26 rigid with said member 21 and the upper flared portion 27 of piston 3 are designed with a view to align and centering as required for ensuring the proper sliding movement of piston 3 on said sealing member 21.

To facilitate the understanding of the general mode of operation of the device, the latter has been described hereinabove as comprising a gas reserve for retracting the pistons. Similar devices have already been disclosed in prior patents held by the same Applicants. However, in this invention, the relative arrangement of the component elements and their combination with the main device differ somewhat.

Figure 4:
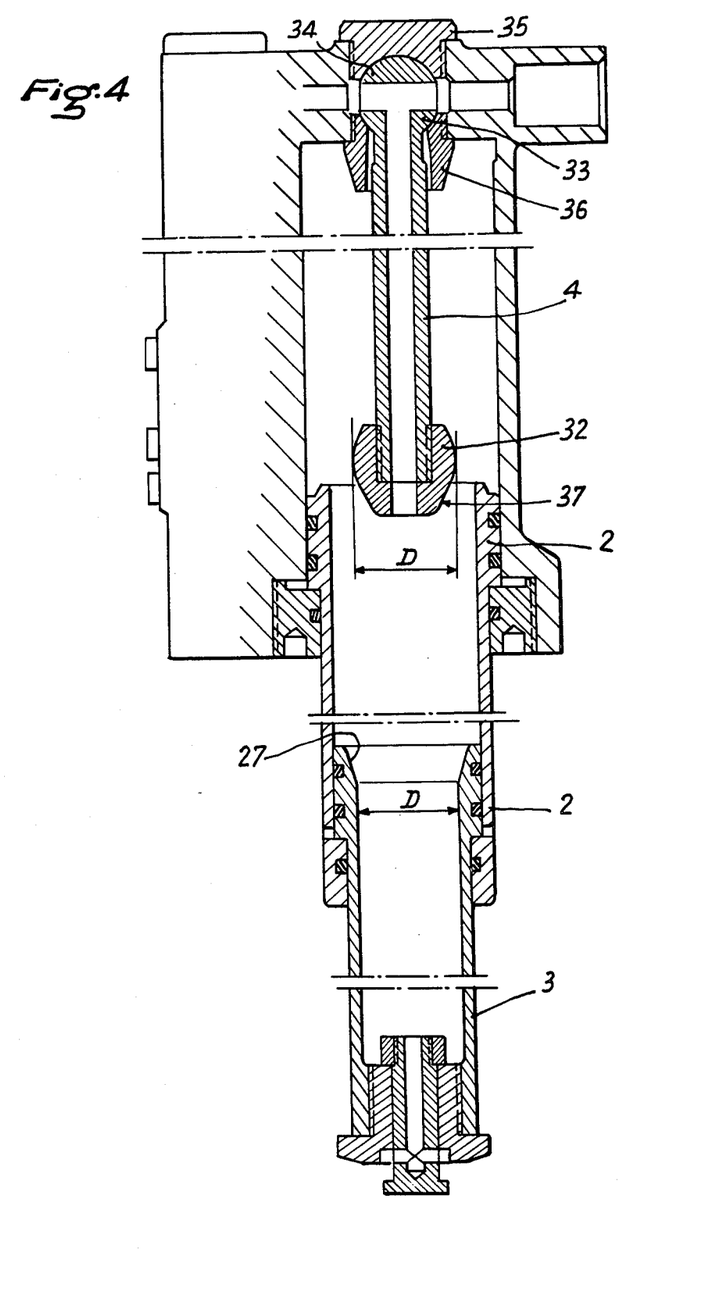
FIG. 4 is a fragmentary view showing a modified embodiment of the device illustrated in FIGS. 1 to 3.

FIG. 4 illustrates a device based on the same principle the description of which, therefore, is not deemed necessary. However, its construction differs considerably. To simplify the description, the sealing member 21 is replaced by an olive-shaped member 32 on which the piston 3 can slide with the minimum play.

For properly aligning this olive-shaped member 32, screwed to the bottom end of hollow cylinder 4 with respect to the piston 3, there is provided a ball and socket unit 33 of which the male spherical portion or ball 34 consists of the upper end of cylinder 4 and the female counterpart or socket 36 is screwed in said body 1. A screw plug 35 keeps the cylinder 4 in position while permitting by proper fitting the free oscillation thereof without any appreciable play. This oscillation is limited in fact by the presence of a circular heel formed on said socket member 36, so that when the piston 3 moves upwards the olive-shaped member 32 is centered sufficiently to enable its flared portion 37 to engage without any difficulty the matching flared portion 27 of piston 3.

The very slight gas leakages resulting from the absence of actual seals are compensated by a minimum pressure sufficient for producing the downward stroke of piston 2 without resorting to a resilient seal such as 28, this pressure being however negligible in comparison with the considerable dynamic pressures implemented. Moreover, the arrangement illustrated in FIG. 4, due to the reduction in the diameter D of the olive-shaped member 32 and the corresponding reductiion in the diameter D of the bore of piston 3, affords a greater discrepancy between the initial surface area (bottom of piston 3) receiving the gas pressure and the final surface area (i.e. the total cross-sectional area of said piston 3). Thus, the efficiency of the device is improved while providing a constant thrust.

The device illustrated in FIGS. 5 to 8 is directed to provide the same result through the same general means, namely an initial reduction of the surface area receiving the ejection pressure. However, whereas in the form of embodiment illustrated in FIGS. 1 to 4 the initial pressure is exerted on one fraction of the inner piston, thus requiring some means for driving nevertheless the outer piston, in order to avoid a sudden taking-up of the difference between the position of the inner piston and that of the outer piston during the last phase of operation of the device, the modified structure shown in FIGS. 5 to 8 is directed to produce satisfactorily the initial stroke of both pistons without any initial difference or shift therebetween, and therefore without resorting to any detrimental taking-up of the delay. For this purpose, in the device illustrated in FIGS. 5 to 8 the gas pressure is exerted during a first phase against the annular cross-sections of these two pistons which are thus driven simultaneously, whereas in the second phase the gas pressure is exerted, in addition, against the bottom of the central piston.

Figure 5:
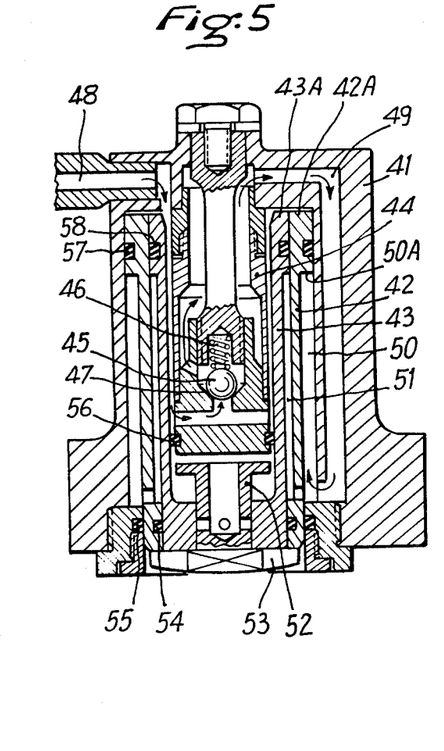
FIG. 5 is an axial longitudinal section showing the device according to a second form of embodiment, with its component elements in retracted position.

In FIG. 5, there is shown diagrammatically at 41 the body of the fixed device in which a piston 42 is adapted to slide, another piston 43 being furthermore adapted to slide in said piston 42. Secured to the upper portion of said body 41 is a hollow central cylinder 44 comprising a valve, for example in the form of a ball 45 urged by a spring 46 against its seat 47. The reference numeral 48 further denotes the gas inlet and 49 denotes a passage permitting the communication betwedn the hollow central cylinder 44 and the annular cavities 50 and 51 located under the heads of pistons 42 and 43, respectively. A spool valve 52 constantly bearing with its head 53 against the load to be ejected or jettisoned is shown in its initial position, also retracted. Seals 54, 55, 56, 57 and 58 are also shown.

Figure 6:
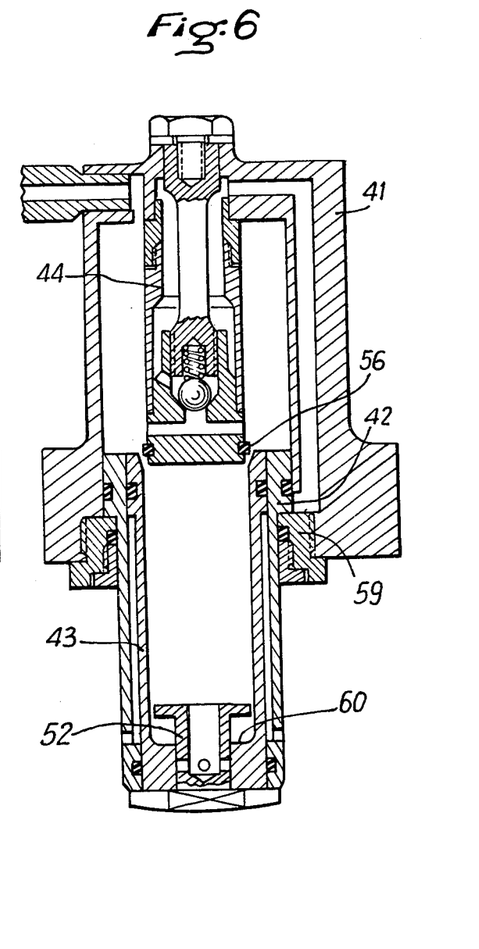
FIG. 6 illustrates the device of FIG. 5 after the first phase of the piston movements.

In FIG. 6, the two pistons 42 and 43 are shown in the position attained simultaneously thereby at the end of the first phase of their extension. Piston 42 engages the screw plug 59 at the base of body 41, piston 43 has moved down beyond the seal 56 on the outer periphery of cylinder 44, and the gases can thus exert their pressures against the bottom 60 of the central piston 43.

Figure 7:
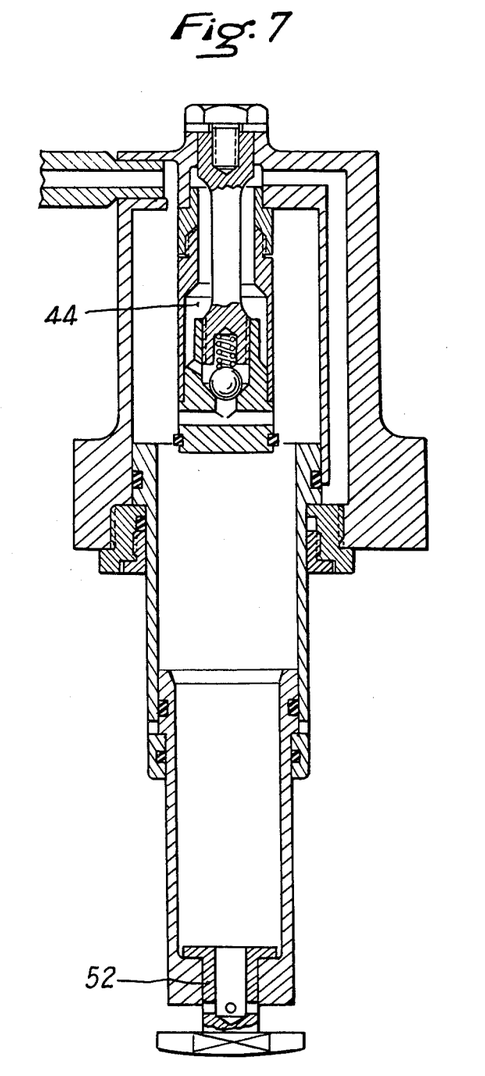
FIG. 7 is a similar view showing the same device in its fully extended condition.

In FIG. 7, the device is shown in its fully extended condition when the load has been ejected, and the spool valve 52 vents to the free atmosphere any residual gas.

Only gases under the maximum pressure, kept in reserve in the central cylinder 44, can exert a pressure against the outer surface of the head of outer piston 42 in order to retract the latter, and then, after the return stroke of this outer piston, this gas pressure will be exerted from underneath against the outer portion of the head of the central piston.

Figure 8:
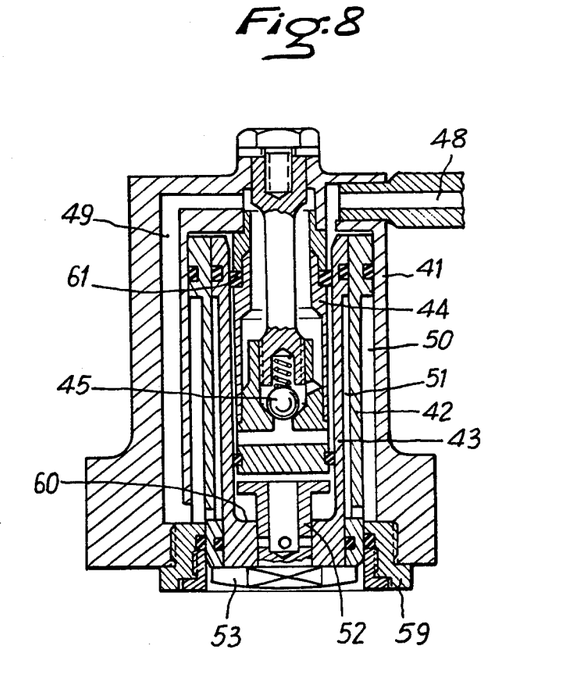
FIG. 8 is a view similar to FIG. 5 but comprising an additional retarding seal.

In FIG. 8 there is shown an additional seal 61 adapted to retard if necessary the flow of gases towards the central cylinder 44 and the annular cavities 50 and 51 underlying the piston heads. This seal 61 disposed around the upper portion of cylinder 44 may be released as a consequence of the downward stroke of pistons 42 and 43.

The operation of the device illustrated in FIGS. 5 to 8 is clearly apparent from the drawings and may be briefly explained as follows. The gases penetrating through the union or like inlet port 48 exert their pressure simultaneously against the heads of pistons 42 and 43, and flow likewise into the reserve chamber formed within cylinder 44 via the path shown by the arrows in FIG. 5, thus lifting the ball valve 45. This chamber retains the gases at their highest pressure due to the non-return function of ball valve 45, and communicates via passage 49 with the pair of circular cavities 50 and 51 controlling the retraction of both pistons 42 and 43. The maximum pressure is thus exerted against the upper annular surfaces 42A and 43A of pistons 42 and 43, respectively, and also against the annular surfaces provided under the heads of these pistons. To sum up, the initial useful surface area is reduced to the difference between the sum of the annular surfaces 42A and 43A, and the annular surface 50A under the head of piston 42.

It will be noted that the gas pressure is exerted simultaneously on both pistons and that these pistons can only move down simultaneously. When the head of piston 42 abuts with its surface 50A the edge of plug 59 (this movement being somewhat damped), due to the pressure prevailing in cavity 50 the piston 43 is positioned beyond the seal 56 as shown in FIG. 6. Consequently, the gases partially expanded during the first phase of the stroke will exert a relatively reduced pressure against the bottom 60 of piston 43, and the additional useful surface area thus available will compensate the pressure drop while regularizing the thrust.

As already mentioned in the Applicants' patents referred to hereinabove, and also in the above description of the structure shown in FIGS. 1 to 4, when the load has been ejected and separated from the device the spool valve 52 tends to assume the position illustrated in FIG. 7, thus venting to the free atmosphere the residual gases retained upstream. The reserve of gas under maximum pressure will then perform its usual function by pushing the heads of pistons 42 and 43 from underneath, thus retracting these pistons in succession until they resume the positions in which they are illustrated in FIG. 5.

When certain gas generators are used, the maximum pressure is attained only after a predetermined piston stroke. Therefore, to obtain as usually required a thrust having the maximum regularity, it was found adequate to produce the counter-pressure under the piston heads only when the gas pressure tends to attain its maximum value. For this purpose, a complementary seal 61 (FIG. 8) is contemplated in the above-described device, for preventing the gases from progressing along the path shown in FIG. 5, as long as the pistons have not been moved to a level below the aforesaid seal 61. Then, the gas flow may take place for operating the device as described hereinabove, but with the desired relative shift between the pistons.

Although specific forms of embodiment of this invention have been described and illustrated herein, it will readily occur to those conversant with the art that various modifications and changes may be brought thereto without departing from the basic principles of the invention as setforth in the appended claims.

What we claim is:

1. A telescopic retractable ejector, for ejecting a load from an aircraft by gas thrust, comprising:
    (i) a cylinder body
    (ii) inlet means for feeding said cylinder body with gas under pressure
    (iii) an outer ejection piston slidably mounted within said cylinder body,
    (iv) an inner ejection piston telescopically slidable within said outer ejection piston
    (v) means located between said inner and outer pistons for releasably interconnecting said outer and inner ejection pistons during an extension stroke of the outer piston, said means automatically allowing the disconnection of said pistons at the end of the extension stroke of the outer piston to permit an extension stroke of the inner piston relative to the outer piston,
    (vi) means defining a gas storage chamber connected through a non-return valve to said inlet means for storing gas received therefrom under maximum pressure,
    (vii) means defining a path of flow from said inlet means for applying gases under maximum pressure against a reduced surface area of an inner part of the inner ejection piston to ensure a simultaneous extension stroke of the two ejection pistons together, a connection being provided between the inner part of the inner ejection piston and the inner space of the cylinder body, said connection being operative only at the end of the extension stroke of the outer ejection piston to apply gas under reduced pressure to an upper outer flange of the inner piston to cause said inner piston to extend at a speed similar to the extension speed of the outer piston,
    (viii) a spool valve on said inner piston for automatically venting to the atmosphere, at the end of the extension stroke of the inner piston, residual ejection gases remaining within the inner piston,
    (ix) means defining a passage automatically connecting said gas storage chamber to a chamber located between a wall of the outer piston and a wall of the cylinder body, when said spool valve vents to the atmosphere the inner space of the inner piston, to apply stored gas under maximum pressure under a head portion of said outer piston to return said outer piston to a retracted position, said outer ejection piston having an opening for connecting automatically, at the end of the retraction stroke of the outer piston, said chamber located between the walls of the outer piston and the cylinder body to a chamber located between a wall of the inner piston and said wall of the outer piston, to apply gas under maximum pressure under a head portion of said inner piston to return said inner piston to a retracted position.

2. A telescopic retractable ejector, according to claim 1, in which said means for applying gas under pressure to the inner part of the inner piston comprises a fixed central cylinder which, when the ejection pistons are in their retracted positions, is disposed within said inner piston.

3. A telescopic retractable ejector, according to claim 2, wherein said central cylinder carries a sealing member capable of pivoting slightly thereon for allowing the proper alignment of said sealing member with said inner piston which slides along the outer surface of said sealing member.

4. A telescopic retractable ejector, according to claim 3, wherein said connection between the inner part of the inner piston and the inner space of the cylinder body is opened by a disengagement of said inner piston from said sealing member at the end of the extension stroke of the inner and outer pistons together.

5. A telescopic retractable ejector, according to claim 1, wherein the means for applying gas under pressure to the inner part of the inner piston comprise a hollow central cylinder pivoted at an end to the cylinder body and comprising at its other end an olive-shaped member slidably engageable within said inner piston until said inner piston is released from said central cylinder.

6. A retractable ejector, according to claim 1, wherein said gas storage chamber is enclosed, within an auxiliary cylinder, by a spring-loaded piston associated with said non-return valve.

7. A telescopic retractable ejector for ejecting a load from an aircraft by gas thrust, comprising:
   (i) a cylinder body
   (ii) inlet means for feeding gas under pressure to said cylinder body,
   (iii) an outer ejection piston slidably mounted within said cylinder body,
   (iv) an inner ejection piston telescopically mounted within said outer ejection piston,
   (v) means defining a gas storage chamber within said cylinder body connected through a non-return valve to said inlet means, for storing gas under maximum pressure, a connection being provided between said storage chamber and annular chambers located between a wall of the cylinder body and a wall of the outer piston and between a wall of the inner piston and said wall of said outer piston to provide said annular chambers with gas under maximum pressure,
   (vi) a head portion of said outer piston having an upper face of greatest surface area to which is applied the gas pressure from the inlet means and an opposite lower face of reduced surface area submitted to gas under maximum pressure from the storage chamber to reduce the outer piston extension speed,
   (vii) a head portion of said inner piston having an upper face of greatest area to which is applied the gas pressure from the inlet means and an opposite lower face of reduced surface area submitted to gas under maximum pressure from the storage chamber to reduce the inner piston extension speed,
   (viii) means providing a connection, between the inlet means and an inner part of the inner piston, operative at the end of an extension stroke of the outer and inner pistons together, to apply gas under reduced pressure to an inner surface area of the inner piston for allowing said inner piston to perform a further extension stroke at a speed similar to its speed of extension together with the outer piston,
   (ix) a spool valve on said inner piston for automatically venting to the atmosphere, at the end of the further extension stroke, residual ejection gases remaining within the inner piston, an automatic retraction of the outer piston and then of the inner piston being successively obtained by said connection, by the storage chamber, and by the annular chambers.

8. A telescopic retractable ejector, according to claim 7, wherein an additional seal is mounted on a central cylinder forming said storage chamber to allow an ingress of thrust gases into said storage chamber only after a predetermined partial stroke of said outer and inner pistons.

* * * * *